United States Patent [19]

Constantino et al.

[11] Patent Number: 5,692,569
[45] Date of Patent: Dec. 2, 1997

[54] HORSESHOE SYSTEM

[75] Inventors: Guilherme E. K. Constantino, Auburn, Ala.; Clarin Mustad, Bulle, Switzerland

[73] Assignee: Mustad, Incorporated, Bloomfield, Conn.

[21] Appl. No.: 544,118

[22] Filed: Oct. 17, 1995

[51] Int. Cl.$^6$ .................................................. A01L 3/00
[52] U.S. Cl. .................................................. 168/17
[58] Field of Search .......................... 168/18, 19, 21, 168/22, 17, DIG. 1

[56] References Cited

U.S. PATENT DOCUMENTS

| | | | |
|---|---|---|---|
| 483,602 | 10/1892 | Covell | 168/22 |
| 513,360 | 1/1894 | Covell | 168/22 |
| 600,744 | 3/1898 | Rupert et al. | 168/21 |
| 3,732,929 | 5/1973 | Glass | 168/18 |

*Primary Examiner*—Robert P. Swiatek
*Attorney, Agent, or Firm*—Alix, Yale & Ristas, LLP

[57] ABSTRACT

A horseshoe support system supports a horseshoe on the bottom of a horse hoof by attachment of the horseshoe to the side of the hoof. The horseshoe has an upper surface engageable with the bottom of the hoof and an arrangement of a plurality of peripheral connectors spaced around the horseshoe. The horseshoe support system comprises a plurality of separate anchor pads, each having an inner face adapted to be adhesively secured at a selected position to the side of the hoof. Each anchor pad further has an outer connector, to provide an arrangement of anchor pad connectors around the side of the hoof adjacent to the arrangement of horseshoe connectors. Each anchor pad connector is positioned for connection to at least one horseshoe connector. The horseshoe support system further has a plurality of separate intermediate links, including at least on of said intermediate links for each anchor pad, each operable for connecting a horseshoe connector to an anchor pad, to support the horseshoe on the bottom of the hoof. The plurality of separate intermediate links are operable to hold the horseshoe against the bottom of the hoof and are selectively detachable from at least some of the connectors for removing the horseshoe from the hoof without removing the anchor pads from the hoof.

25 Claims, 7 Drawing Sheets

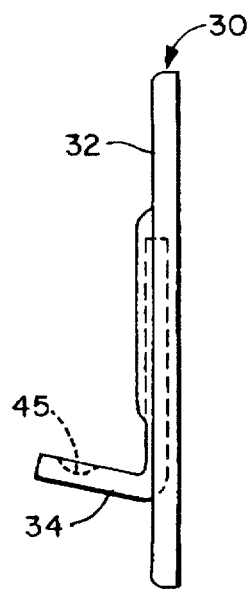
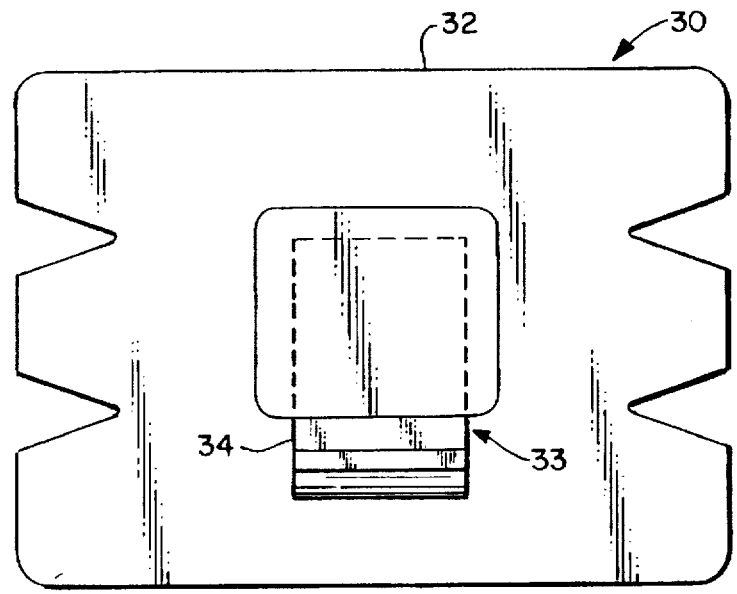
FIG. 5a  FIG. 5b
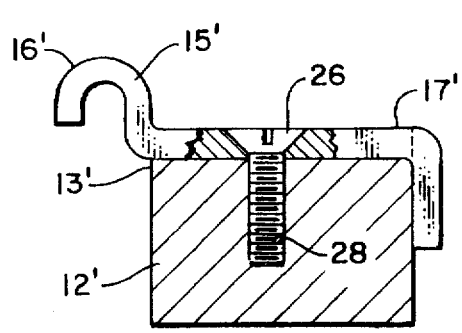
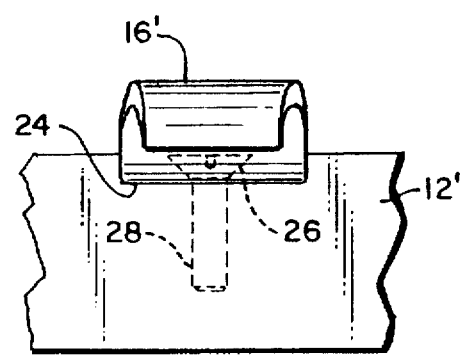
FIG. 6a  FIG. 6b 5,692,569

HORSESHOE SYSTEM

FIELD OF THE INVENTION

The present invention relates to the field of shoeing horses. More particularly, the invention relates to a system for shoeing horses without the use of nails.

BACKGROUND OF THE INVENTION

Horseshoes have been used on horses for hundreds of years. The most widely accepted method of shoeing a horse employs horseshoe nails. The nails are driven through holes in the horseshoe and into the hoof. Routine inspection of the bottom of the hoof can only be accomplished by removing the shoe. Repeated nail removal and reinstallation can cause unnecessary damage and stress to the hoof and eventually horse lameness.

Shoeing a horse with nails in the conventional manner requires a relatively high level of skill and therefore can be quite expensive. Also, since horseshoes have to be frequently refitted, as often as every six weeks, the continuing maintenance of properly fitted shoes can be very costly.

Various methods have been proposed for shoeing a horse without the use of nails. In some methods, conventional nails are replaced by devices that penetrate the side of the hoof. Other methods use a ring or clamp around the hoof. Both approaches have significant disadvantages. In another approach, a molded plastic horseshoe is adhesively secured to the hoof. That approach does not permit routine inspection of the bottom of the hoof and employs plastic horseshoes which wear much faster than conventional metal horseshoes.

SUMMARY OF THE INVENTION

The horseshoe system of the present invention comprises a plurality of separate anchor assemblies for supporting a horseshoe on the bottom of the hoof by anchoring the horseshoe to the side of a hoof. Each anchor assembly comprises an anchor pad adhesively bonded to the side of the hoof and an intermediate link connecting the horseshoe to the anchor pad. In the preferred embodiment, three anchor pads and three intermediate links are provided at the front and sides of the hoof.

The anchor assemblies are designed to hold the horseshoe securely against the bottom of the hoof. Each anchor assembly is preferably adjustable to change the force of engagement of the horseshoe with the bottom of the hoof. The anchor assemblies use different types of intermediate links. They include adjustable latches and straps and tension springs.

The horseshoe has a plurality of peripheral clips for connecting the intermediate links to the horseshoe. The clips preferably project upwardly from the outer edge of the horseshoe to fit around and engage the side of the hoof. Removable clips are used with horseshoes specially constructed for receiving the clips. Non-removable clips can also be used, for example by permanently securing the clips to the horseshoe body when it is made.

A primary object of the present invention is to provide a new and improved horseshoe system that does not employ horseshoe nails or other devices which penetrate the hoof.

Another object of the invention is to provide a new and improved horseshoe system that enables the horseshoe to be easily removed from the hoof to facilitate routine inspection of the hoof.

A further object of the invention is to provide a new and improved horseshoe system that does not require a high level of training or skill for implementation.

Yet another object of the invention is to provide a new and improved horseshoe system that can be used with both plastic and metal horseshoes.

A further object of the invention is to provide a new and improved horseshoe system that holds the horseshoe against the bottom of the hoof with the desired force and which can be loosened or tightened as desired while the horseshoe remains attached to the hoof.

Other objects will be in part obvious and in part pointed out more in detail hereinafter.

A better understanding of the invention will be obtained from the following detailed description and accompanying drawings of illustrative embodiments of the invention.

BRIEF DESCRIPTION OF THE DRAWINGS

FIGS. 5a and 5b are side and front views, of an anchor pad employed in the horseshoe installation of FIG. 1;

FIG. 6a is a partial section view, partly in section, of a modified horseshoe which may be employed in the horseshoe installation of FIG. 1;

FIG. 6b is a partial edge view, partly broken away, of the modified horseshoe of FIG. 6a;

DESCRIPTION OF PREFERRED EMBODIMENTS

Figure 1:
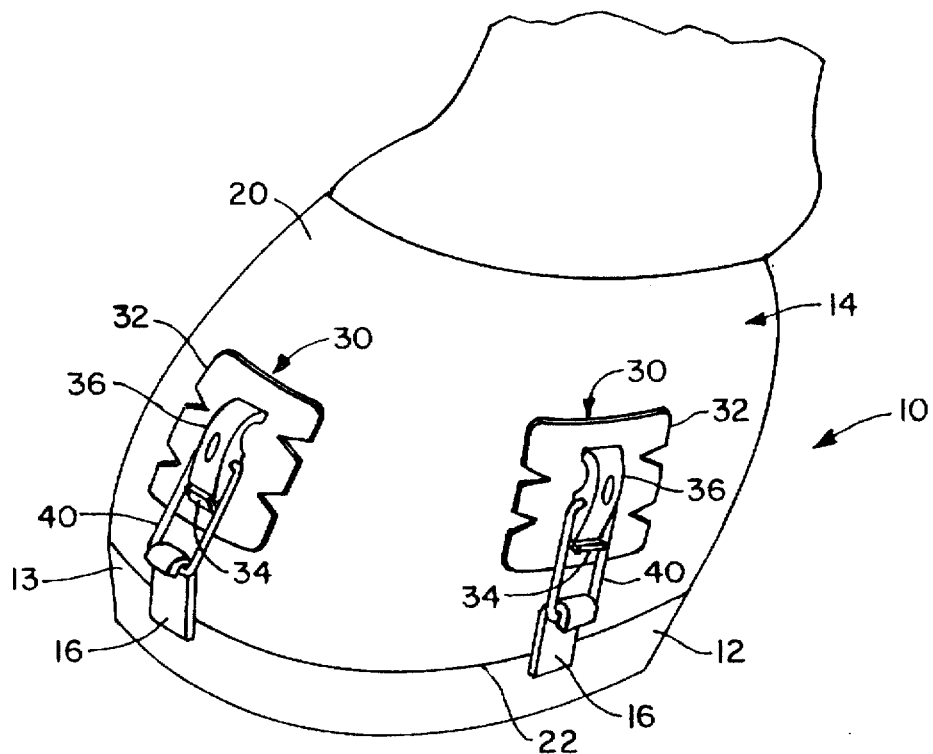
FIG. 1 is a perspective view, partly broken away, of a horseshoe installation incorporating a first embodiment of the present invention.

In the drawings and in the following description of the embodiments of the present invention disclosed in the drawings, like numerals are used to identify like components.

Figure 2:
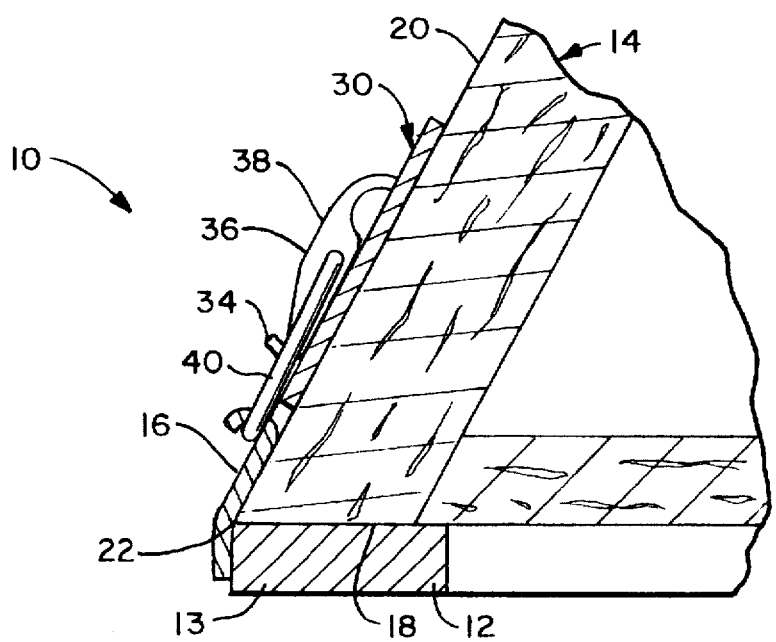
FIG. 2 is a side elevation section view, partly broken away and partly in section, of the horseshoe installation of FIG. 1.
Figure 3A:
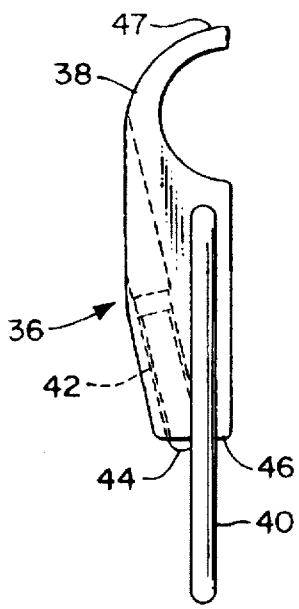
FIGS. 3a and 3b are side and front views of an overcenter latch mechanism employed in the horseshoe installation of FIG. 1.
Figure 3B:
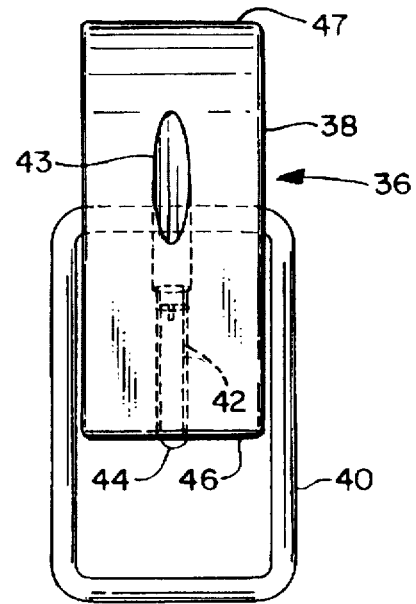

Referring to FIGS. 1–3, a horseshoe system incorporating a first embodiment 10 of the present invention is shown installed on a horse hoof 14 with a horseshoe supported on the bottom 18 of the hoof 14. As is well known, the horse hoof 14 has a generally flat bottom 18 and a relatively smooth rounded sidewall 20 around the front and sides of the hoof. The intersection of the bottom 18 and hoof sidewall 20 defines a lower outer edge 22 of the hoof. In a conventional manner, the horseshoe is shaped to have an outer edge 13 generally conforming to the lower outer edge 22 of the hoof. (See FIGS. 1 and 2.)

Figure 9:
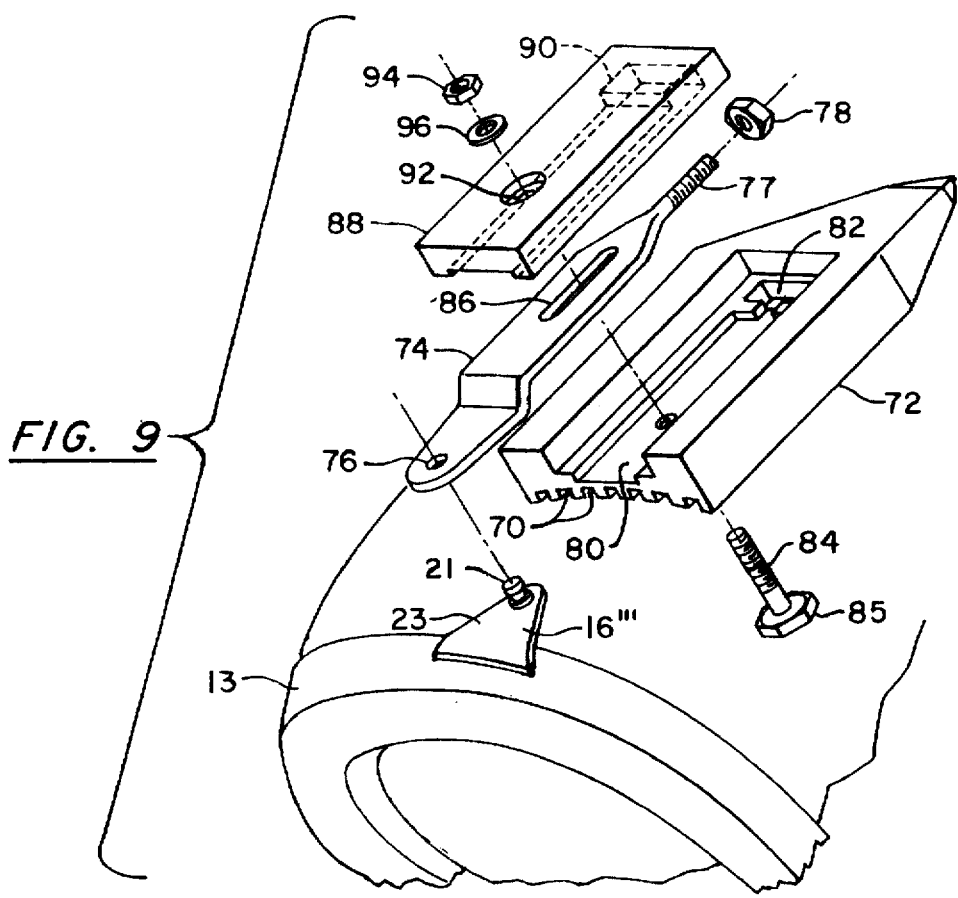
FIG. 9 is an exploded perspective view, partly broken away, of an anchor pad and link assembly of the horseshoe installation of FIG. 7.

The horseshoe comprises a generally conventional horseshoe body 12 and a plurality of peripheral connectors or clips 16. The clips 16 are affixed to the horseshoe body 12 by welding or by rivets or bolts. The clips 16 extend upwardly from the outer edge 13 of the horseshoe body 12 so that they fit around and are engageable with the side 20 of the hoof. The clips 16 thereby help position the horseshoe 12 on the hoof and help hold the horseshoe 12 against lateral displacement on the hoof. In the embodiments shown in FIGS. 2, 6, 7 and 10, the clip 16, clip 16', clip 16" and clip 16''' are stamped from heavy sheet metal and form an upstanding hook which faces or opens downwardly and outwardly. In another embodiment shown in FIG. 9, the clip 16''' comprises a stud 21 projecting laterally from a sheet metal base 23. The stud 21 is welded, riveted or screwed to the base 23.

Figure 10:
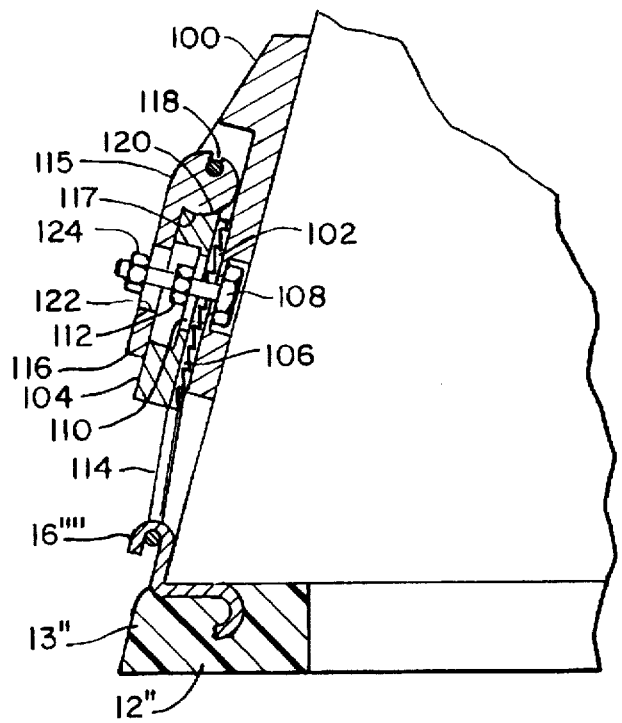
FIG. 10 is a side elevation section view, partly broken away and partly in section, of a horseshoe installation incorporating another embodiment of the present invention.

In FIG. 6, the horseshoe body 12' is shown designed to accept a removable clip 16'. (See FIGS. 6a, 6b.) The removable clip 16' is positioned within a flat radial slot 24 in the top of the horseshoe body 12'. The clip 16' has a flat body 17' received in the slot 24. The slot depth is preferably equal to the thickness of the flat body 17'. The horseshoe, therefore, has a flat top surface providing for continuous contact with the flat bottom 18 of the hoof. A screw 26 is screwed into a threaded hole 28 in the horseshoe body 12' to hold the clip 16' in place. This permits replacement of the clip 16' when broken and reuse of the clip 16' when the horseshoe body 12' is no longer useable. In FIG. 10, the clip 16''' is fixed to a molded horseshoe body 12" (made of plastic or other synthetic material) when the body is molded. The clip 16''' has an upper hook end configured for receiving an intermediate connecting link and a lower end configured to fix the clip to the molded body 12".

A plurality of anchor pads 30 are provided for anchoring the horseshoe body 12 to the hoof. The anchor pads 30 have enlarged inner support pads 32 with slightly concave inner faces adapted to be adhesively bonded to the sidewall 20 of the hoof 14. (See FIGS. 1 and 2.) A cyanoacrylate or epoxy based glue is used to adhere the support pads 32 to the hoof 20. The support pads 32, which are preferably constructed of polyurethane, are sufficiently flexible to conform to the natural curved shape of the side of the hoof. The inner faces of the support pads 32 preferably have a plurality of parallel grooves 70. (See FIGS. 7 and 9.) Also, the support pads 32 have scalloped or slotted side edges 71. The grooves 70 and slotted edges 71 increase the flexibility of the thick inner support pad 32 and thereby permit the inner face of the support pad 32 to expand and contract with the hoof. The support pad 32 has a relatively large inner face (e.g., with a surface area of approximately 1.6 square inches) for securely bonding the support pad 32 to the side 20 of the hoof. (See FIGS. 1 and 2.)

Three anchor pads 30 are preferably provided. One anchor pad is preferably located on the front center of the hoof 14. The remaining anchor pads are preferably located at the widest points on the sides of the hoof. (See FIGS. 1 and 7.) Likewise, three corresponding clips 16, 16', 16", 16''' and 16''' are preferably located on the front center and at the widest points on the sides of the horseshoe body 12. The three anchor pads 30 are thereby provided directly above the three horseshoe clips.

Each anchor pad 30 has a suitable connector 33 for receiving an intermediate link for connecting the anchor pad 30 to the horseshoe. In FIGS. 2 and 5, the connector 33 is shown formed in the shape of a hook 34. The hook 34 projects outwardly from the support pad 32 at a slight angle so that it extends upwardly and outwardly from the hoof. The anchor hook 34 is fixed to the support pad 32 when the anchor pad 32 is molded. (See FIGS. 5a and 5b).

An intermediate link is provided for each anchor pad 30. In one embodiment, the intermediate link is provided by an overcenter latch 36 having an elongated latch body 38 and a bail 40. A threaded bore 42 in the latch body 38 receives a threaded adjustment rod 44. (See FIGS. 1, 2, 3a and 3b.) The latch body 38 has a nose 46 at its inner end, a midsection, and a latch handle 47 at its outer end. The bail 40 is pivotably mounted on the midsection of the latch body 38. The bail 40 is dimensioned to receive the hook of a respective clip 16.

In use, the outer open end of the bail 40 is mounted on the horseshoe clip 16. The nose 46 of the latch body 38 is then positioned on the anchor hook 34 with the latch body 38 angled away from the support pad 32. The latch body 38 is then rotated on the anchor hook 34 toward the anchor pad 32 to set the latch 36. The clip 16 is pulled upwardly toward the anchor hook 34 as the latch body 38 is rotated toward the anchor pad 32. The arrangement provides an overcenter latch connecting the horseshoe clip 16 to the anchor pad 30. To open the latch 36, the handle 47 is pivoted outwardly away from the support pad 32.

The adjustment rod 42 is rotated with a screwdriver to change the effective length of the latch. The anchor hook 34 has a small concave seat 45 for receiving the inner rounded end 44 of the adjustment rod 42. Rod adjustment changes the latch tension and thus the force of the horseshoe 12 against the bottom of the hoof 14. The adjustment rod 42 is also used to compensate for variations in the position of the anchor pad 30 relative to the horseshoe clip 16. The adjustment rod 42 thereby provides greater freedom in positioning the anchor pads 30 on the hoof. Also, the three pivot points of the latch 36 help compensate for any misalignment between the clip 16 and the anchor pad 30.

Figure 4A:
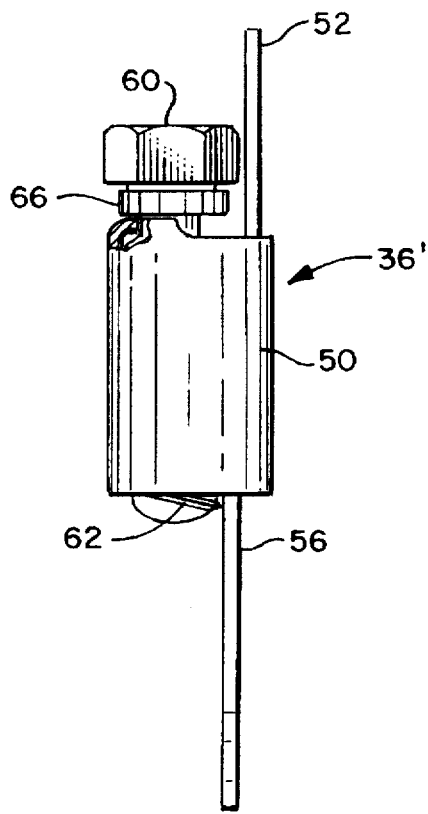
FIGS. 4a and 4b are side and front views of another latch mechanism which may be employed in the horseshoe installation of FIG. 1.
Figure 4B:
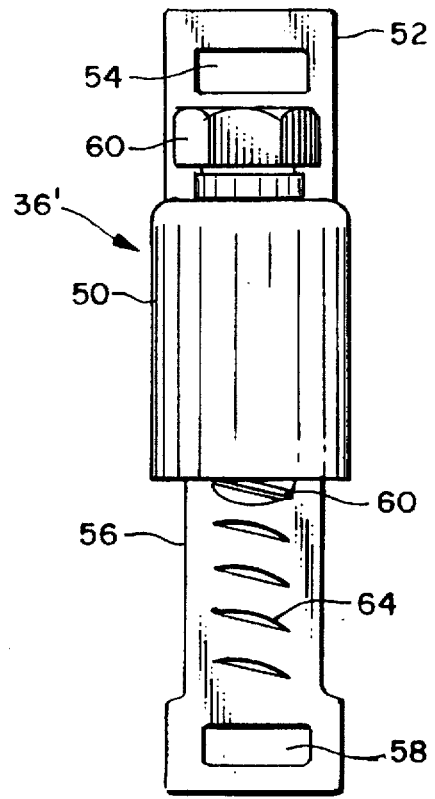
Figure 7:
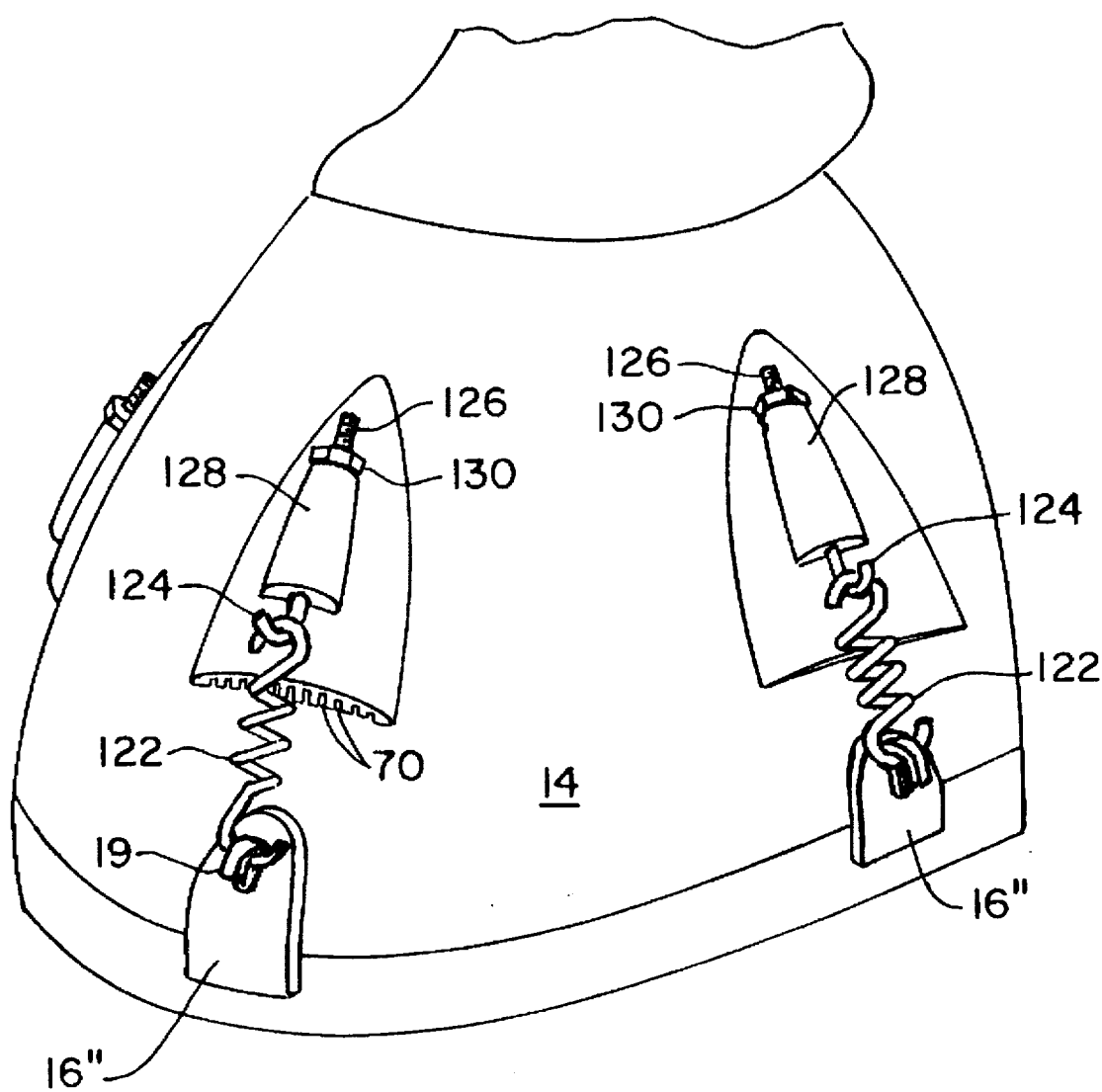
FIG. 7 is a perspective view, partly broken away, of a horseshoe installation incorporating another embodiment of the present invention.

In another embodiment, the intermediate link is provided by an adjustable strap 36' like that used in conventional hose clamps. (See FIGS. 4a and 4b.) The strap type latch 36' has a pair of overlying straps 52 and 56. The upper strap 52 supports a body 50 with an adjustment screw 60. The strap 52 has a slot 54 at its outer end for receiving an anchor pad hook 32. The lower strap 56 has a similar slot 58 at its outer end for receiving a horseshoe clip. The lower strap 56 has a series of angled openings 64 for engagement with the clamp screw 60.

In use, the strap type latch 36' is mounted on and between a horseshoe clip 16 and anchor pad hook 34. The screw 60 is then rotated by a suitable screwdriver or wrench to draw the lower strap 56 upwardly toward the anchor hook 34. The strap adjustment is used to adjust the force of the horseshoe 12 against the bottom of the hoof. The adjustability of the strap and the articulation of the strap 36' on the anchor pad hook 34 and horseshoe clip 16 provides flexibility in positioning the anchor pad 30 on the side of the hoof.

Figure 8:
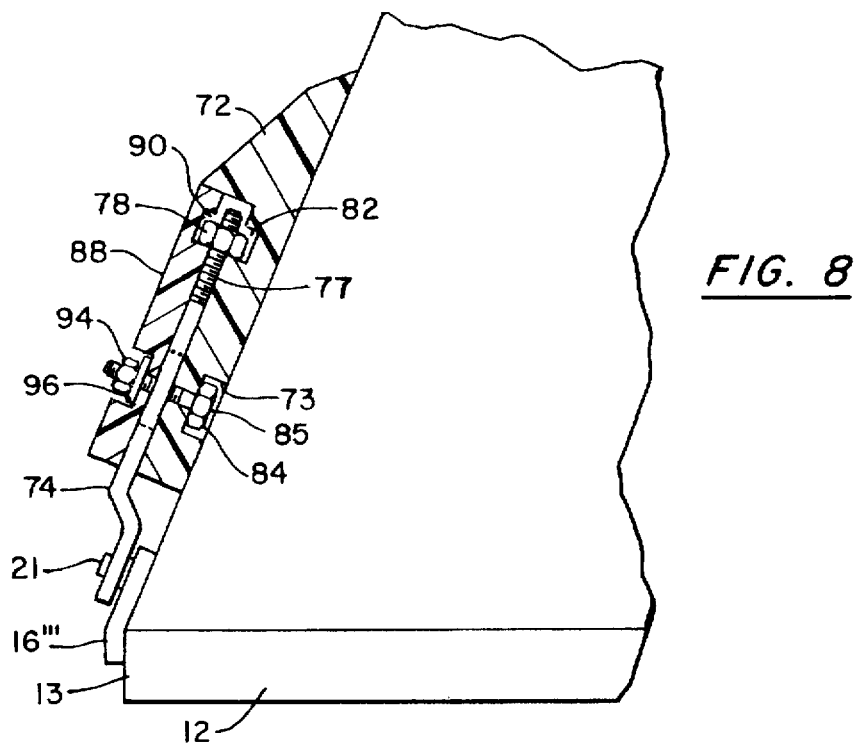
FIG. 8 is a side elevation section view, partly broken away and partly in section, of the horseshoe installation of FIG. 7.

In another embodiment, an anchor pad 72 has an elongated channel 80 which is contoured to receive and support an elongated link 74. (See FIGS. 8 and 9.) The lower end of the link 74 has an opening 76 for receiving the post 21 of the clip 16'''. The upper end 77 of the link 74 is threaded for receiving an adjustment nut 78. In use, the link 74 is mounted on the post 21 and then fitted into the channel 80 so that the adjustment nut 78 is received in a nut cavity 82. The adjustment nut 78 engages a shoulder formed by the lower end of the cavity 82. Tightening the adjustment nut 78 pulls the link 74 upwardly to pull the horseshoe 13 against the bottom of the hoof.

A hold-down cover 88 is mounted on the anchor pad 72 and link 74 to retain the link on the anchor pad 72. A threaded bolt 84 extends through the anchor pad 72, an elongated opening 86 in the link 74 and an opening 92 in the cover 88. The head 85 of the bolt 84 is captured in a recess 73 in the inner surface of the anchor pad 72. The hold-down cover 88 prevents inadvertent disengagement of the link 74 and protects the link 74 from damage. The hold-down cover 88 has a recess 90 for receiving the link 74 and the adjustment nut 78. The cover 88 is held in position by a nut 94 and washer 96 mounted on the outer end of the bolt 84.

In another embodiment, the intermediate link comprises a tension spring 122 connected between an adjustable anchor pad hook 124 and the hook of the horseshoe clip 16". (See FIG. 7.) The spring 122 can be installed under tension with a pair of spring expansion pliers (not shown) or other similar device. The anchor pad connector is provided by the hook 124 and a hook support 128 formed integrally with the anchor pad support 32. The hook 124 has an elongated rod 126 extending through an opening in the hook support 128. The rod 126 has threads at it outer end for receiving an adjustment nut used for adjusting the tension of the spring 122.

Figure 11:
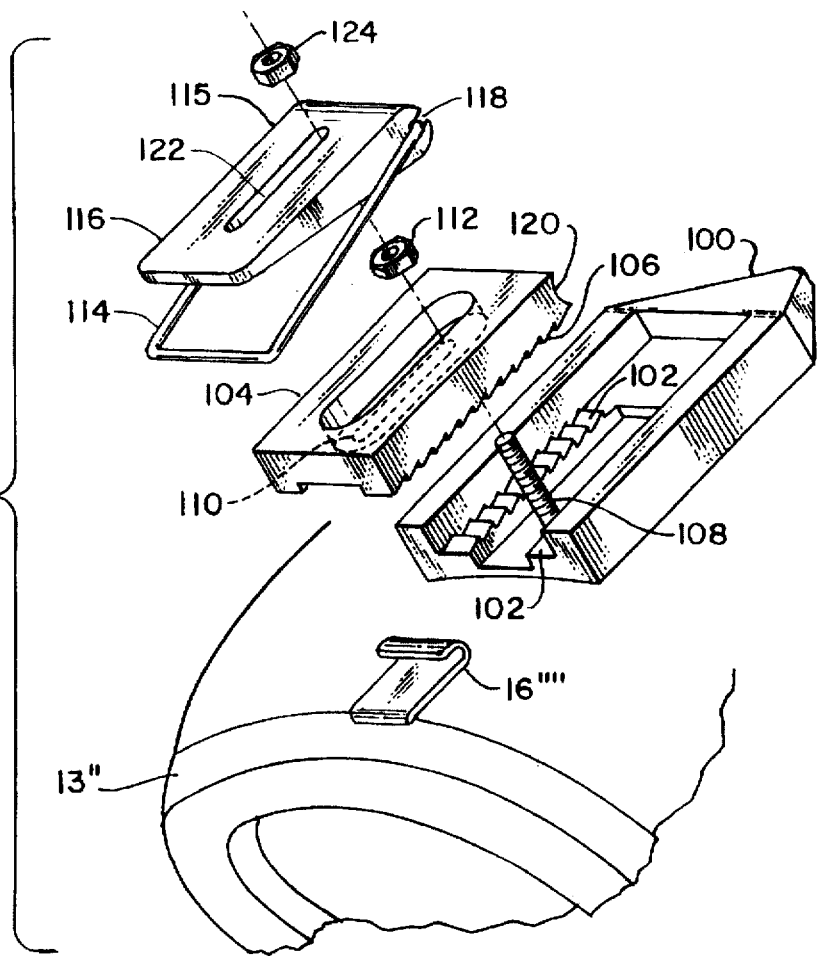
FIG. 11 is a partly exploded perspective view of the horseshoe installation of FIG. 10.

In another embodiment, the anchor pad connector has a base portion with a plurality of parallel, upwardly facing, abutment teeth 102 (facing away from the horseshoe 13). (See FIGS. 10 and 11.) A separate bearing block 104 has a plurality of opposed parallel abutment teeth 106 adapted to mesh with the fixed teeth 102. The opposed teeth 102 and 106 enable the bearing block 104 to be longitudinally positioned to compensate for variations in the distance between the anchor pad 100 and the horseshoe. The anchor block 104 is positioned to provide the desired link tension when the intermediate latch is engaged. A support bolt 108 extends through the anchor pad 100 between the teeth 102 and through a slotted opening in the bearing block 104. The bearing block is locked in position by a lock nut 112 mounted on the support bolt 108. The upper lateral edge 122 of the bearing block 104 provides a concave bearing surface. The anchor pad 100 and clip 16'" are connected by an overcenter latch having a bail 114 and a latch body 115. The latch body 115 has a lateral cam surface 117 engageable with and conforming to the bearing surface 120 of the bearing block 104. A latch body handle 116 covers the top of the bearing block 104 when the latch is engaged. The latch body 115 has a lateral slot 118 for receiving the bail 114. In use, the bail 114 is mounted in the bail slot 118 and over the clip 16'". The latch body 115 is then positioned on the bearing surface 120 and rotated from an open position where the latch handle 116 extends generally perpendicular to the hoof wall 20 to a closed position where the latch handle 116 covers the bearing block 104. The latch body 115 has a slotted opening 122 for receiving the bolt 108. A nut 124 is mounted on the end of bolt 108 to hold the latch handle 116 in its closed position.

Figure 13:
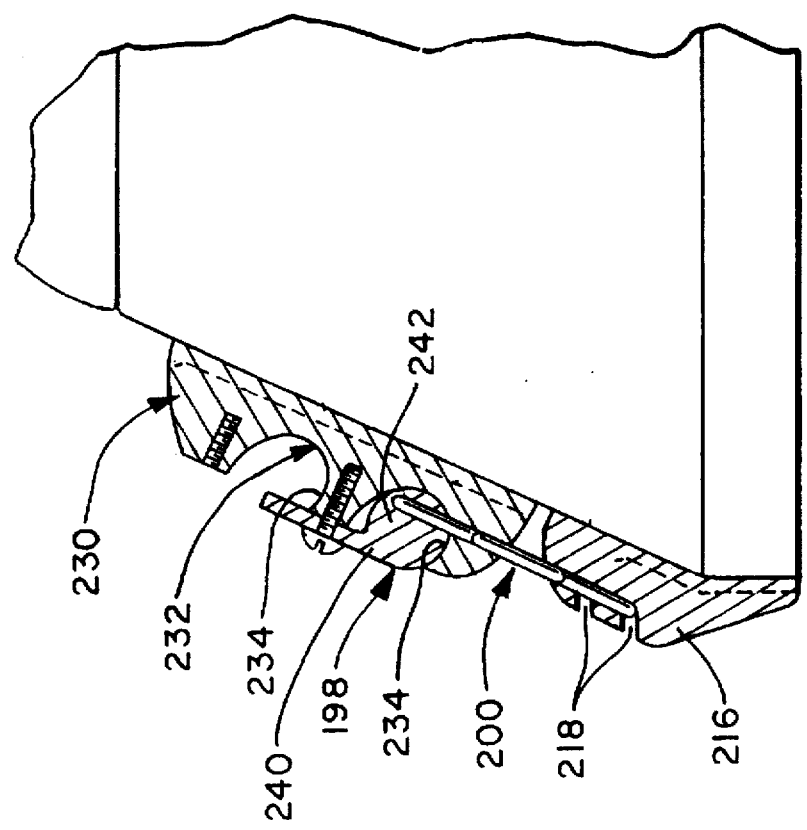
FIG. 13 is a side elevation section view, partly broken away and partly in section, of the horseshoe installation of FIG. 12.
Figure 12:
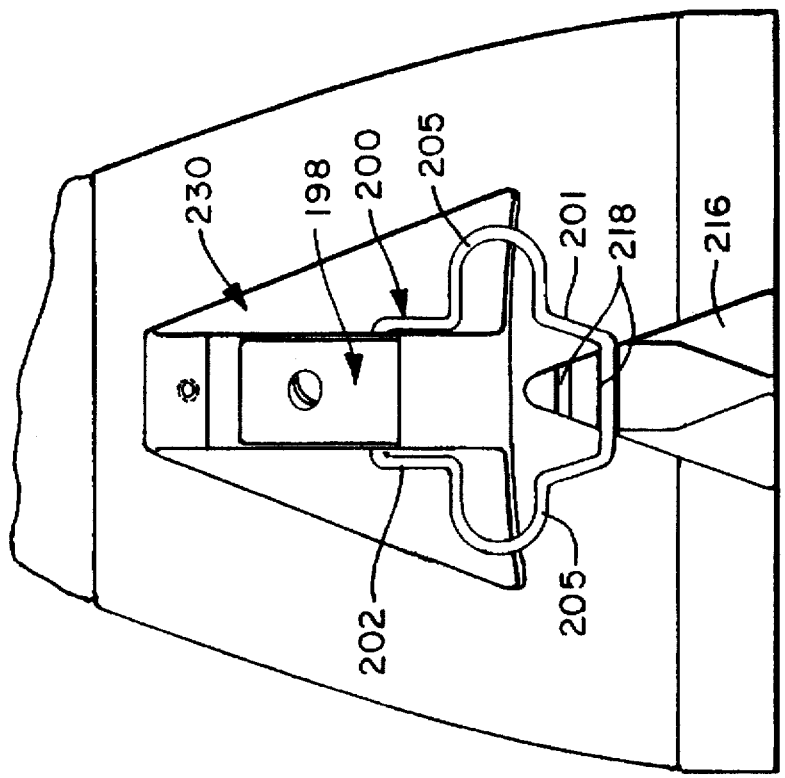
FIG. 12 is a front view, partly broken away, of a horseshoe installation incorporating another embodiment of the present invention.

In another embodiment shown in FIGS. 12 and 13, the intermediate link 198 comprises a preformed wire body 200 made of suitable spring wire. The wire body 200 serves as a tension spring for pulling the horseshoe upwardly against the bottom of the hoof. The wire body 200 has a pair of opposed rigid end sections 201, 202 and a pair of opposed, laterally extending spring sections 205 between the end sections 201,202. The horseshoe connector 216 has a pair of parallel slots 218 for receiving the lower end section 201. The parallel slots 218 are inclined to retain the lower end section 201 against inadvertent withdrawal. An anchor pad connector 232 (integrally formed with the rest of the anchor pad 230) has a pair of parallel support bearings 234. A handle or lever 240 (like the handle 115 in the embodiment shown in FIGS. 10 and 11) forms an overcenter latch with the wire body 200. The handle 240 has a pivot bearing or cam 242 adapted to be mounted on one of the concave support bearings 234. In use, the lower end 201 of the wire body is installed in a selected slot 218 in the horseshoe clip 216 and the pivot bearing 242 is mounted on a selected support bearing 234 so that the wire body 200, when the overcenter latch is set, is under appropriate tension.

While preferred embodiments of the invention have been set forth, the foregoing description should not be deemed to limit the scope of the present invention. Various modifications, adaptations and alternatives may occur to one having ordinary skill in the art without departing from the spirit and scope of the present invention.

What is claimed is:

1. A horseshoe support system for supporting a horseshoe on the bottom of a horse hoof by attachment of the horseshoe to the side of the hoof, the horseshoe having an upper surface engageable with the bottom of the hoof and an arrangement of a plurality of peripheral connectors spaced around the horseshoe; the horseshoe support system comprising a plurality of separate anchor pads, each having an inner face adapted to be adhesively secured at a selected position to the side of the hoof and an outer connector, to provide an arrangement of anchor pad connectors around the side of the hoof adjacent to the arrangement of horseshoe connectors and with each anchor pad connector positioned for connection to at least one horseshoe connector; and a plurality of separate intermediate means, including at least one of said intermediate means for each anchor pad, each operable for connecting a horseshoe connector to an anchor pad connector, to support the horseshoe on the bottom of the hoof, the plurality of separate intermediate means being operable to hold the horseshoe against the bottom of the hoof and being selectively detachable from at least some of the connectors for removing the horseshoe from the hoof without removing the anchor pads from the hoof.

2. The horseshoe support system of claim 1 wherein the support system has three of the anchor pads adapted to be adhesively secured to the side of the hoof in alignment with the front center and approximately the widest point on each side of the horseshoe respectively.

3. The horseshoe support system of claim 1 wherein each anchor pad connector has a hook for receiving one of said intermediate means.

4. The horseshoe support system of claim 1 wherein each of said intermediate means comprises latch means mounted for pivotal movement on the respective anchor pad connector for latching the respective horseshoe connector to the anchor pad connector.

5. The horseshoe support system of claim 4 wherein the latch means is an overcenter latch.

6. The horseshoe support system of claim 1 wherein each of said intermediate means comprises a tension spring.

7. The horseshoe support system of claim 1 wherein each anchor pad comprises an inner support pad having a said inner face.

8. The horseshoe support system of claim 7 wherein the inner face of each support pad has a plurality of grooves.

9. The horseshoe support system of claim 7 wherein each support pad has irregular side edges.

10. The horseshoe support system of claim 1 wherein each of said intermediate means comprises a threaded screw rotatable to adjust the effective length of the intermediate means between the respective horseshoe and anchor pad connectors.

11. The horseshoe support system of claim 1 wherein each anchor pad connector comprises a connector base with a first plurality of parallel teeth and a separate connector body with a second plurality of parallel teeth and adapted to be selectively mounted on the connector base with said second teeth in meshing engagement with said first teeth.

12. The horseshoe support system of claim 1 wherein each anchor pad connector has an outer face with a cavity contoured for receiving one of said intermediate means.

13. In a horseshoe system comprising a horseshoe having a horseshoe body and an arrangement of a plurality of peripheral connectors spaced around the horseshoe body, the horseshoe body having an upper surface and adapted to be supported on a horse hoof with said upper surface engaging the bottom of the hoof; and a horseshoe support system for supporting the horseshoe body on the bottom of the hoof by attachment of the horseshoe to the side of the hoof; the improvement wherein the support system comprises a plurality of separate anchor pads, each having an inner face adapted to be adhesively secured at a selected position to the side of the hoof and an outer connector, to provide an arrangement of anchor pad connectors around the side of the hoof, each positioned for connection to at least one horseshoe connector; and a plurality of separate intermediate means, including at least one of said intermediate means for each anchor pad, for connecting the horseshoe connectors to the anchor pad connectors at a plurality of positions around the horseshoe to support the horseshoe body on the bottom of the hoof, the plurality of separate intermediate means being operable to hold the horseshoe body against the bottom of the hoof and being selectively detachable from at least some of the connectors for removing the horseshoe from the hoof without removing the anchor pads from the hoof.

14. The horseshoe system of claim 13, wherein the horseshoe system has three of the anchor pads and three of said horseshoe connectors, the horseshoe connectors being located at the front center and at approximately the widest point on each side of the horseshoe body.

15. The horseshoe system of claim 13 wherein the horseshoe connectors extend upwardly beyond said upper surface to fit around and to be engageable with the side of the hoof.

16. A horseshoe system comprising a horseshoe with a horseshoe body and a set of a plurality of peripheral connectors spaced around the horseshoe body, the horseshoe body having an upper surface and adapted to be supported on a horse hoof with said upper surface engaging the bottom of the hoof; the horseshoe system further comprising a horseshoe support system for supporting the horseshoe body on the bottom of the hoof by attachment of the horseshoe to the side of the hoof; the support system comprising a plurality of separate anchor pads, each having an inner face adapted to be adhesively secured at a selected position to the side of the hoof and an outer connector to provide a set of anchor pad connectors around the side of the hoof; and a plurality of separate intermediate means for connecting the horseshoe connectors to the anchor pad connectors, the plurality of separate intermediate means being operable to hold the horseshoe body against the bottom of the hoof and being selectively detachable from at least some of the connectors for removing the horseshoe from the hoof without removing the anchor pads from the hoof.

17. The horseshoe system of claim 16 wherein each of said intermediate means is adjustable to adjust the distance between the respective horseshoe connector and anchor pad connector.

18. The horseshoe system of claim 16 wherein the horseshoe body is molded at least in part and the horseshoe connectors are fixed to the horseshoe body when the horseshoe body is molded.

19. The horseshoe system of claim 16 wherein each horseshoe connector comprises an outwardly projecting stud.

20. The horseshoe system of claim 16 wherein the horseshoe body has a transverse slot in its upper surface for each horseshoe connector and wherein each horseshoe connector has a generally flat portion received in a said slot in the horseshoe body and a removable fastener which fixes the horseshoe connector to the horseshoe body.

21. The horseshoe system of claim 16 wherein each anchor pad connector is adjustable to adjust the distance between the horseshoe connector and the inner face of the respective anchor pad.

22. The horseshoe system of claim 16 wherein each of said intermediate means comprises a tension spring connected between the respective horseshoe and anchor pad connectors.

23. The horseshoe system of claim 16 wherein each of said intermediate means comprises overcenter latch means for latching the horseshoe connector to the anchor pad connector, the latch means comprising a latch body pivotally mounted on the respective anchor pad connector and a bail pivotally mounted on the latch body for receiving a horseshoe connector.

24. The horseshoe system of claim 16 wherein each of said intermediate means comprises a preformed wire body having a first open end portion at one end thereof adapted to be mounted on a horseshoe connector and a second open end portion at the opposite end thereof adapted to be mounted on an anchor pad connector, the wire body having an intermediate spring section adapted to place the wire body under tension between the respective horseshoe and anchor pad connectors.

25. The horseshoe system of claim 24 wherein each of the connectors of at least one of the sets of connectors comprises a plurality of laterally extending slots for selectively receiving one of the open end portions of the wire body.

\* \* \* \* \*